March 1, 1966     N. L. VINSON     3,237,443
DYNAMIC PRESSURE GENERATOR FOR CALIBRATION
Filed Dec. 23, 1963
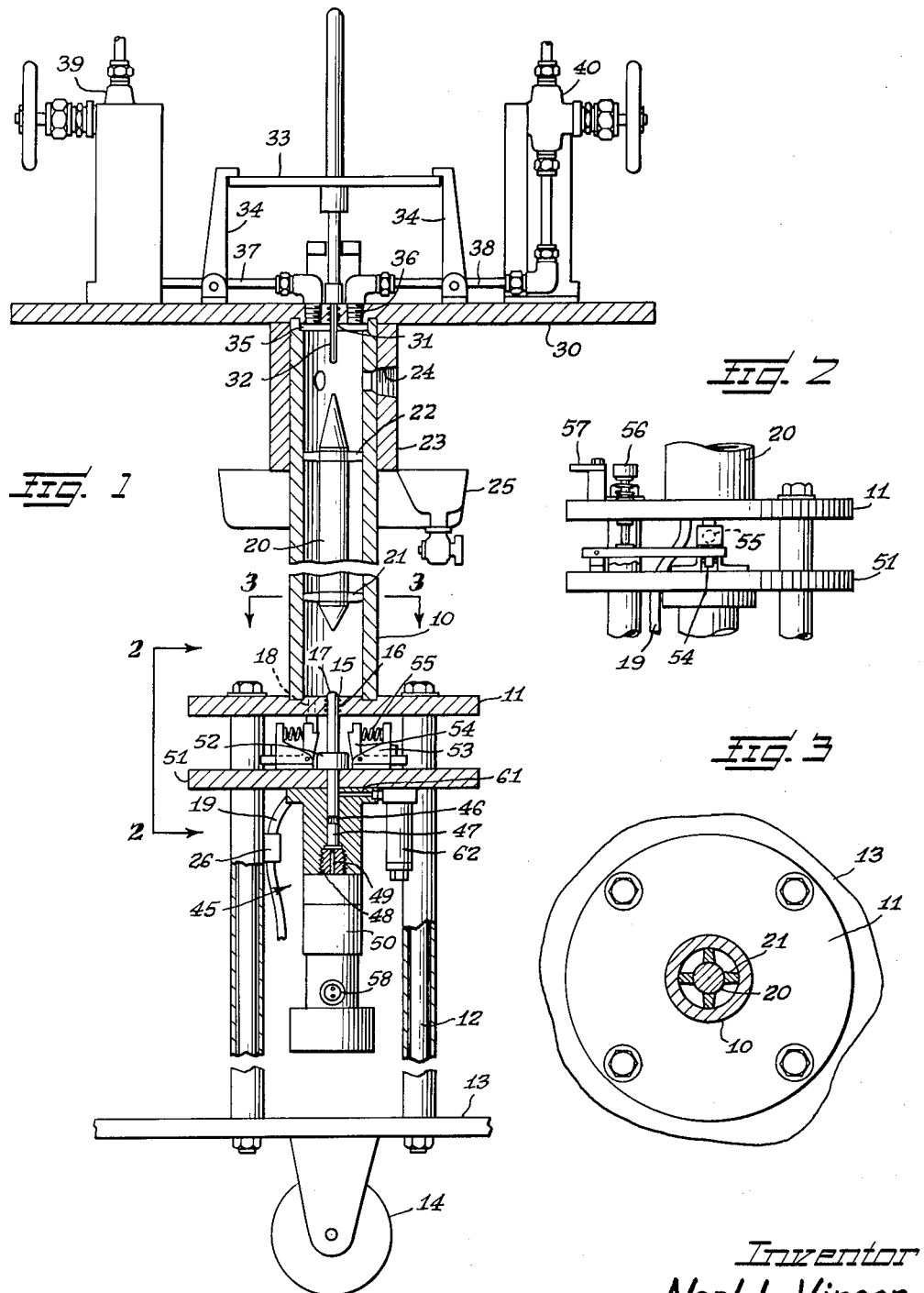
Inventor
Neal L. Vinson
By Edward L. Amonette
Agent United States Patent Office 3,237,443
Patented Mar. 1, 1966

3,237,443
DYNAMIC PRESSURE GENERATOR
FOR CALIBRATION
Neal L. Vinson, 836 Arizona St. SE.,
Albuquerque, N. Mex.
Filed Dec. 23, 1963, Ser. No. 332,530
4 Claims. (Cl. 73—4)

My invention relates generally to the calibration of pressure sensors, and more particularly to apparatus for applying dynamic pressures to the sensors.

The dynamic calibration of pressure sensors has long been a problem. One approach has been to calibrate the sensors with a static pressure and to presume that this calibration was valid under dynamic conditions. Many times, however, this was a false assumption. The inertia of moving parts within the sensor frequently causes it to perform very differently under changing pressures than it does when subjected to static pressures.

Some dynamic pressure generators do exist, but these produce only a transient pressure and one which is not reproducible to a high accuracy and which is not controllable over a wide range of values.

It is therefore a general object of my invention to provide a dynamic pressure generator producing a repeatable dynamic pressure of controllable value rising from a minimum to a maximum in a very brief period of time and remaining near the maximum value if desired.

In factories where pressure sensors are manufactured it is desirable to have facilities for testing large numbers of sensors quickly and easily. Another object of my invention is to provide a dynamic pressure generator capable of simultaneously subjecting a plurality of pressure sensors to the same dynamic pressure.

Briefly, my invention accomplishes these and other objects to become apparent, by means of an apparatus including a tube containing a plurality of fluids having different compressibilities. The proportions of fluids can be varied, thus varying the value and wave form of a dynamic pressure generated within the tube when a plunger is forced into the fluid by explosive means. A specially shaped member located coaxially within the tube reduces the amount fluid necessary, and assures that the same pressure appears at every location on the tube wall, in which a plurality of ports are provided for mounting of pressure sensors to be tested. A latching means is provided for retaining the plunger at its position of maximum travel into the tube, thus retaining the maximum pressure within the fluid. An optional second plunger may be provided in the other, uppermost, end of the tube when the tube is mounted vertically. This plunger has attached to it means for receiving weights so that the device may be used as a dead weight tester for static calibrations.

A better understanding of my invention may be had by reading the more detailed description to follow in conjunction with the appended claims and the attached drawing, in which:

FIG. 1 is a longitudinal sectional view of a preferred embodiment of my invention;

FIG. 2 is a partial side elevation view of the embodiment, indicated by the line 2—2 of FIG. 1, showing controls for the latching means; and FIG. 3 is an enlarged cross sectional view of the tube, taken along line 3—3 of FIG. 1, showing the means for mounting the internal member within the tube.

Referring now to the drawing, thick-walled tube 10 is shown supported on horizontal plate 11 which is in turn fastened by bolts 12 to a base 13 mounted on casters 14. Tube 10 is joined to plate 11 by welding or other leak-proof means. The plate has a hole 15 in its center in which are mounted a plurality of O-rings 16 to form a leak-proof seal plunger 17, which is shown extending partially into tube 10.

Coaxially within tube 10 is shown axially symmetrical member 20 which has the same cross-sectional shape as the tube and which is supported within the tube by perforated members 21 and 22. The ends of member 20 are tapered for reasons later to be explained.

Near the upper end of tube 10 is a collar 23 in which are a number of threaded ports 24 aligned with ports extending through the wall of tube 10. These ports are for the mounting of pressure sensors to be tested. Drain trough 25 is provided to catch any fluid spilling from ports 24 during removal of pressure sensors.

Top plate 30 is welded to the tube at the top and has a hole 31 in its center through which protrudes plunger 32. The plunger is suitably sealed with O-rings to prevent the loss of fluid from within tube 10. Platform 33 is attached to plunger 32 for the support of suitable weights, so that the device may be used as a dead weight tester, or so that the weights may be used to modify any pressure pulse produced within the tube. Latches 34 are provided to prohibit movement of plunger 32 when so desired.

Additional holes 35 and 36 in plate 30 are provided for the attachment of suitable plumbing 37 and 38 and valves 39 and 40 for the entry of fluids into tube 10.

At the bottom of my invention gun 45 slidably receives plunger 17 in barrel 46. Explosive means 47 is mounted in the bottom end of the barrel and held therein by threaded plug 48. Firing pin 49 extends through the center of the plug and is driven by solenoid 50.

Horizontal plate 51 is supported by bolts 12 directly below plate 11, and supports gun 45. Plunger 17 has an enlarged portion 52 which rests against plate 51 as shown. Also supported by plate 51 is latching assembly 53, shown in duplicate. This assembly includes a pivot member 54 which is biased toward plunger 17 by spring 55. Spring biased reset button 56 (FIG. 2) unlatches assembly when pushed, and may be locked to disable the assembly by rotating member 57 to a position over the top of depressed button 56.

The theory behind my invention is that a plunger inserted into a fluid-filled, rigid-walled container will produce a sizeable pressure increase in the fluid. The preferred embodiment was developed to provide pressures of thousands of pounds per square inch with the maximum pressure of about five times the minimum. In order to be able to use a tube of convenient length, but with sufficient diameter for the mounting of more than one pressure sensor it was found necessary to provide inner member 20 to displace some of the volume of fluid, the member having considerably less compressibility than various commonly available fluids. The member has perforated supports 21 and 22 to allow the transmission of a shock wave from the bottom to the top of the tube through the fluid, and the ends of the member are tapered so that the shock is distributed evenly around the circumference of the tube.

In order to vary the pressure generated by my invention it would be necessary to vary either the degree of penetration by plunger 17, the volume of the fluid, or the compressibility of the fluid. The preferred embodiment is designed to allow variation in the compressibility of the fluid, since this will give the most variation in pressure. Valves 39 and 40 are connected to separate sets of plumbing for the introduction of two different fluids. Preferred fluids to be used in the invention are those which are non-miscible with each other, such as mercury and water or glycerine and turpentine. It is this use of multiple fluids which allows precise and modulated control of the pressure pulse amplitudes between the pressure limits established by the design of the pressure chamber.

Another desired variable in dynamic pressure testing is the rise time of the pressure wave, or the time it takes the pressure to increase from the starting pressure to the maximum pressure. In my invention this is controllable by controlling the speed with which plunger 17 is inserted into the fluid, which in turn is controlled by the explosive force of the gun. Explosive device 47 may be a shell casing for a hand gun, suitably primed and containing a precisely weighed amount of powder.

Operation of the invention is as follows: the pressure sensor to be tested is screwed into port 24, any unused ports being plugged. Then, depending upon the peak pressure desired, a predetermined proportion of fluids is measured into tube 10 by means of valves 39 and 40. The tube is completely filled with the fluids, all air being allowed to escape through the valves. Plunger 32 is either clamped in place by means of latches 34, or is loaded with suitable weights on platform 33. Plug 48 and its attached parts are removed from gun 45, and a suitably loaded shell 47 is inserted in the gun and the plug replaced. If it is desired that the peak pressure attained be allowed to quickly return to zero, blocking member 57 is operated to hold down reset button 56 and thereby prevent operation of latching assembly 53. If, on the other hand, it is desirable to maintain the peak pressure after operation of the device, blocking member 57 is unlocked so that latching assembly 53 will operate. If the pressure sensor being tested has an electrical output, suitable connections may be made to a recorder or other device for reading the output corresponding to peak pressure.

Firing of the gun is accomplished by connecting an electrical source to connector 58 on the solenoid, operating the solenoid, and driving firing pin 49 into the explosive device 47. The resulting explosion forces plunger 17 upward into fluid filled tube 10. As the bottom end of the plunger passes relief port 61 the pressure behind the plunger is relieved through muffler 62. By this time enlarged portion 52 of the plunger has passed pivoted member 54, and unless the member is disabled spring 55 forces it under enlarged portion 52, thereby retaining the plunger inserted to its extreme in the fluid of tube 10. Enlarged portion 52 serves another purpose by limiting the extent of travel of plunger 17 into the tube.

When the plunger enters the fluid it compresses the fluid and stretches the walls of tube 10. The shock of compression is transmitted upward through the fluid to pressure sensors installed in port 24 and other ports if provided. If plunger 32 is not clamped in position, it will move upward to a degree controlled by the amount of weight on platform 33.

When it is desired to drain the tube in order to change the proportion of fluids therein, or for other reasons, valve 26 may be opened and the fluid will drain out through port 18 and drain line 19. If it is desired to use the device as a dead weight tester latches 34 are removed from platform 33 and the tube is filled with fluid, forcing plunger 32 upward. Then static pressures may be produced within the tube by the addition of weights to platform 33.

An important feature of my invention is the variety of peak pressures available by the mixing of pressure media such as water and mercury, although my invention is not limited to those media. Another important feature is the variability of rise time available by varying the powder charge. Table 1 below tabulates peak pressures and rise times obtained by varying the proportions of water and mercury, and by varying the charge.

Table I

| Percent mercury | Water (cc.) | Mercury (cc.) | Peak pressure (lb./in.$^2$) | Charge (grains) | Rise time (millisec.) |
| --- | --- | --- | --- | --- | --- |
| 0 | 692 | 0 | 1,400 | 0.3 | 3 |
| 10 | 622.8 | 69.2 | 1,500 | 0.3 | 3.5 |
| 20 | 553.6 | 138.4 | 1,600 | 0.3 | 3 |
| 30 | 484.4 | 207.6 | 1,950 | 0.6 | 2 |
| 40 | 415.2 | 276.8 | 2,150 | 0.6 | 2 |
| 50 | 346.0 | 346.0 | 2,500 | 0.6 | 2 |
| 60 | 276.8 | 415.2 | 2,800 | 0.6 | 2.5 |
| 70 | 207.6 | 484.4 | 3,350 | 0.6 | 3 |
| 80 | 138.4 | 553.6 | 4,200 | 0.9 | 1.7 |
| 90 | 69.2 | 622.8 | 5,500 | 1.2 | 2.0 |

This exemplary data is from the preferred embodiment, and is not intended to limit my invention. Nor is my invention limited to the preferred embodiment, it being subject to changes recognized by those skilled in the art, within the limits of the claims below.

I claim as my invention:

1. A dynamic pressure generator comprising:
   a tube having an opening in one end;
   a first plunger, one end of which extends through said opening normally partially into the tube;
   a gun slidably receiving the other end of the first plunger in its barrel;
   explosive means for firing the gun and thereby forcing the first plunger farther into the tube;
   latching means for retaining the first plunger at its position of maximum travel into the tube;
   a plurality of fluids contained within the tube, said fluids having different compressibilities;
   an axially symmetrical member supported coaxially within the tube and having the same cross sectional shape as the tube, further having tapered ends and an outer diameter smaller than the inner diameter of the tube;
   and means for mounting at least one pressure sensor in the tube for sensing fluid pressures.

2. The pressure generator of claim 1 wherein:
   the gun barrel is ported for the relief of pressure behind the first plunger at a specified point in its travel into the tube.

3. The pressure generator of claim 2 wherein:
   the sensor mounting means is located in the tube wall near the other end.

4. The pressure generator of claim 3 wherein:
   the tube is supported vertically with the one end lowermost, further including:
   an opening in the other, uppermost, end;
   a second plunger extending downward through said opening into the tube;
   supporting means for weights, attached to said second plunger above and outside of the tube;
   and means for optionally preventing movement of the second plunger in response to generated pressures.

References Cited by the Examiner

UNITED STATES PATENTS 2,539,418    1/1951    Grogan _____ 73—4
2,696,105    12/1954   Makas _____ 73—49.4 X LOUIS R. PRINCE, *Primary Examiner.*

S. C. SWISHER, *Assistant Examiner.*